(12) United States Patent
Ochiai et al.

(10) Patent No.: US 9,308,884 B2
(45) Date of Patent: Apr. 12, 2016

(54) CURTAIN AIRBAG DEVICE

(71) Applicant: HONDA MOTOR CO., LTD., Tokyo (JP)

(72) Inventors: Fumiharu Ochiai, Saitama (JP); Kazuaki Miyamoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/394,605

(22) PCT Filed: Apr. 16, 2013

(86) PCT No.: PCT/JP2013/061272
§ 371 (c)(1),
(2) Date: Oct. 15, 2014

(87) PCT Pub. No.: WO2013/161626
PCT Pub. Date: Oct. 31, 2013

(65) Prior Publication Data
US 2015/0097360 A1  Apr. 9, 2015

(30) Foreign Application Priority Data
Apr. 23, 2012  (JP) .................................. 2012-097998

(51) Int. Cl.
*B60R 21/232* (2011.01)
*B60R 21/213* (2011.01)
*B60R 21/231* (2011.01)

(52) U.S. Cl.
CPC ............. *B60R 21/232* (2013.01); *B60R 21/213* (2013.01); *B60R 21/23138* (2013.01)

(58) Field of Classification Search
CPC ...................................................... B60R 21/232
See application file for complete search history.

(56) References Cited

U.S. PATENT DOCUMENTS 5,924,723 A * 7/1999 Brantman et al. ......... 280/730.2
6,394,487 B1 * 5/2002 Heudorfer et al. ............ 280/729
(Continued)

FOREIGN PATENT DOCUMENTS

CN          1695988 A       11/2005
JP          2004-034766     2/2004
(Continued)

OTHER PUBLICATIONS

Japanese Office Action issued Jun. 23, 2015, 3 pages.
(Continued)

*Primary Examiner* — Nicole Verley
(74) *Attorney, Agent, or Firm* — Rankin, Hill & Clark LLP (57) ABSTRACT

A curtain airbag device where an airbag main body provided along a roof side rail is deployed in the form of a curtain inside the vehicle compartment by operation of an inflator. The airbag main body includes a first expansion part disposed at a position overlying a center pillar and supplied with gas by operation of the inflator during deployment; a second expansion part disposed to the rear of the first expansion part and supplied with gas from the first expansion part; and a gas communication part providing communication between the first expansion part and the second expansion part. The gas communication part is provided above a seatbelt interference region where the deployed airbag main body interferes with the seatbelt. When the vehicle is subjected to an external impact and the airbag main body expands, gas flows from the first expansion part to the second expansion part.

4 Claims, 4 Drawing Sheets

(56) References Cited

U.S. PATENT DOCUMENTS

| | | | |
|---|---|---|---|
| 6,450,527 B2* | 9/2002 | Kobayashi et al. | 280/729 |
| 6,454,296 B1* | 9/2002 | Tesch et al. | 280/730.2 |
| 6,454,298 B1* | 9/2002 | Hardig et al. | 280/730.2 |
| 7,059,630 B2* | 6/2006 | Maertens et al. | 280/730.2 |
| 7,325,826 B2* | 2/2008 | Noguchi et al. | 280/730.2 |
| 7,434,831 B2* | 10/2008 | Noguchi et al. | 280/730.2 |
| 8,025,308 B2* | 9/2011 | Fletcher et al. | 280/730.2 |
| 8,360,468 B2* | 1/2013 | Sato et al. | 280/730.2 |
| 8,376,397 B2* | 2/2013 | Yamamura et al. | 280/730.2 |
| 8,382,151 B2* | 2/2013 | Kalandek | 280/730.2 |
| 8,424,906 B2* | 4/2013 | Ochiai et al. | 280/730.2 |
| 8,550,494 B2* | 10/2013 | Ochiai et al. | 280/730.2 |
| 8,641,087 B2* | 2/2014 | Saiki et al. | 280/730.2 |
| 8,651,516 B2* | 2/2014 | Kim et al. | 280/730.2 |
| 8,662,533 B2* | 3/2014 | Wipasuramonton et al. | 280/743.1 |
| 8,801,030 B2* | 8/2014 | Sugimori et al. | 280/730.2 |
| 8,851,507 B1* | 10/2014 | Kemp et al. | 280/728.2 |
| 2002/0101066 A1* | 8/2002 | Tanase et al. | 280/730.2 |
| 2011/0187086 A1* | 8/2011 | Fulmer et al. | 280/730.2 |
| 2012/0126517 A1* | 5/2012 | Kato et al. | 280/730.2 |
| 2013/0270805 A1* | 10/2013 | Kruse et al. | 280/730.2 |
| 2014/0265266 A1* | 9/2014 | Kemp et al. | 280/728.2 |

FOREIGN PATENT DOCUMENTS

| | | |
|---|---|---|
| JP | 2005-029035 | 2/2005 |
| JP | 2007-62599 | 3/2007 |
| JP | 2010-116034 | 5/2010 |
| WO | 03/076236 | 9/2003 |
| WO | 2011/001986 | 1/2011 |
| WO | WO 2012124549 A1 * | 9/2012 |
| WO | WO 2013018781 A1 * | 2/2013 |
| WO | WO 2014181168 A1 * | 11/2014 |

OTHER PUBLICATIONS

Japanese Office Action issued Apr. 21, 2015, 3 pages.
Chinese Office Action dated Dec. 28, 2015.

* cited by examiner

CURTAIN AIRBAG DEVICE

TECHNICAL FIELD

The present invention relates to a curtain airbag device.

BACKGROUND ART

Recently, a curtain airbag device is mounted on more and more vehicles, such as automobiles, wherein when a side collision has occurred on the vehicle, the curtain airbag device protects a passenger by spreading a bag body called an airbag into a curtain shape between a vehicle interior lateral part and the passenger (for example, refer to Patent Document 1).

The airbag main body of the curtain airbag device disclosed by Patent Document 1, which spreads into a curtain shape along a vehicle interior lateral part, includes an expanding portion formed in the protection area of a passenger and an auxiliary chamber formed outside the protection area. The expanding portion and the auxiliary chamber communicate with each other through a gas communicating passage called a venting hole. When the inner pressure of the expanding portion increases by a load of the airbag main body having expanded upon input of a shock, the load restraining a passenger, a part of gas in the expanding portion flows in into the auxiliary chamber through the venting hole. Thus, the pressure in the expanding portion decreases to thereby reduce the peak acceleration on the passenger.

RELATED ART DOCUMENT

Patent Document

Patent Document 1: Japanese Patent Application Publication No. 2004-34766 (see venting hole 31 in FIG. 2)

DISCLOSURE OF THE INVENTION

Problems to be Solved by the Invention

The curtain airbag device disclosed by Patent Document 1 is arranged such that the gas communicating passage (venting hole) making the expanding portion and the auxiliary chamber communicate with each other is located in the vicinity of the anchor portion (fixed to the center pillar) of a three point seatbelt for a front seat passenger when the airbag main body has expanded and spread. Accordingly, when the airbag main body has expanded and spread by a shock from outside, the gas communicating portion has a problem of possibly hitting against the seatbelt to prevent the flow of gas from the expanding portion to the auxiliary chamber.

The present invention has been developed in this situation, and an object of the invention is to provide a curtain airbag device enabling smooth gas flow from an expanding portion to an auxiliary chamber when an airbag main body expands and spreads upon reception of a shock from outside.

Means for Solving the Problems

In order to attain the above-described object, in claim 1 according to the invention, a curtain airbag device capable of spreading an airbag main body provided along a roof side rail of a vehicle into a curtain shape and into a vehicle compartment by operation of an inflator, wherein the airbag main body is disposed at a position where the airbag main body overlaps with a center pillar, and includes, in a spread state, a first expanding portion to which gas is supplied by operation of the inflator, a second expanding portion to which gas is supplied from the first expanding portion, the second expanding portion being disposed posterior to the first expanding portion, and a gas communicating portion for communication between the first expanding portion and the second expanding portion, and wherein the gas communicating portion is arranged, as the most primary feature, above a seatbelt interference region where the airbag main body in the spread state interferes with a seatbelt.

By claim 1 according to the invention, it is possible to make a gas flow smooth from the first expanding portion to the second expanding portion when the airbag main body expands and spreads upon reception of a shock from outside.

In claim 2 according to the invention, the curtain airbag device according to claim 1 is arranged such that the first expanding portion is located adjacent to the seatbelt interference region of the airbag main body in the spread state; and a gas isolating portion extending substantially in a horizontal direction is provided on a side of the seatbelt interference region of the first expanding portion of the airbag main body in the spread state.

By claim 2 according to the invention, the first expanding portion present adjacent to the seatbelt interference region can be appropriately isolated from interference by the seatbelt.

In claim 3 according to the invention, the curtain airbag device according to claim 1 or 2 is arranged such that the airbag main body in the spread state further includes a non-expanding portion to which gas is not supplied by operation of the inflator; and at least a part of the non-expanding portion is arranged such as to overlap with the seatbelt interference region of the airbag main body in the spread state.

Further, in claim 4 according to the invention, the curtain airbag device according to claim 3 is arranged such that the seatbelt interference region is set as the non-expanding portion.

By claim 3 or 4 according to the invention, a passenger protecting function of the curtain airbag device can be sufficiently exerted even in case that the seatbelt interferes with the airbag main body.

Advantage of the Invention

According to the present invention, it is possible to make a gas flow smooth from a first expanding portion to a second expanding portion when an airbag main body expands and spreads upon reception of a shock from outside.

EMBODIMENTS FOR CARRYING OUT THE INVENTION

A curtain airbag device 11 according to first to third embodiments of the present invention will be described below in detail, referring to the drawings.

(Curtain Airbag Device 101 According to a Comparative Example)

Figure 1:
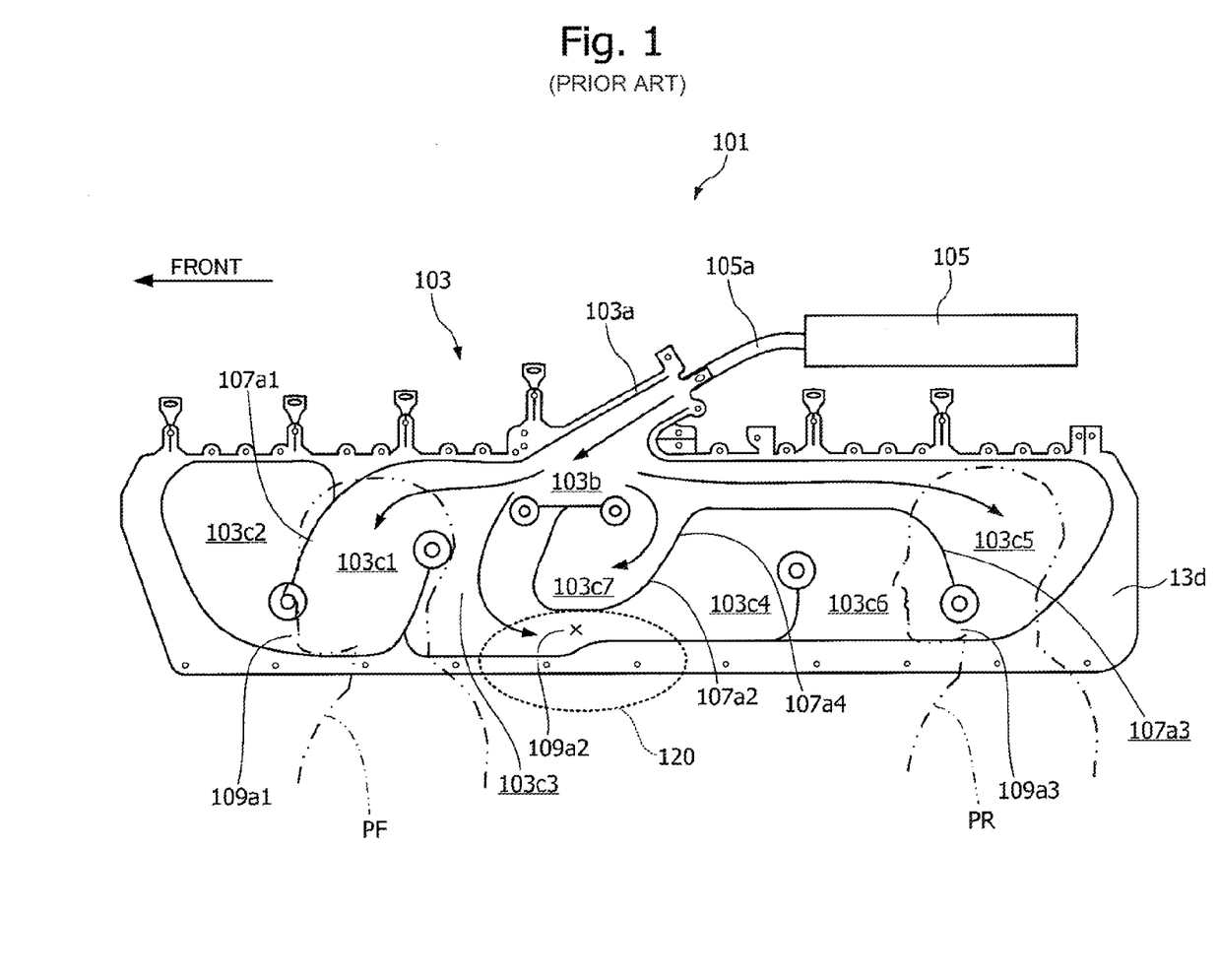
FIG. 1 is an illustration showing a state that the airbag main body of a curtain airbag device according to a comparative example is spread.

Prior to description of the curtain airbag device 11 according to the first to third embodiments of the present invention, a curtain airbag device 101 according to a comparative example will be described below, referring to FIG. 1. FIG. 1 is an illustration of a state that the airbag main body 103 of the curtain airbag device 101 according to the comparative example is spread.

As shown in FIG. 1, the curtain airbag device 101 according to the comparative example includes the airbag main body 103 and an inflator 105 for supplying high-pressure gas into the airbag main body 103 upon input of the shock of a side collision or the like.

Incidentally, arrow (FR) in FIG. 1 represents the front direction of a vehicle (the same hereinafter).

The airbag main body 103 is, for example, a bag body of any one of woven fabric, knit fabric, and non-woven fabric of synthetic. The airbag main body 103 before spreading is housed, for example, on the rear surface side of a roof panel, not shown, in a folded state of an elongate bar shape extending from a front pillar through a roof side rail to a rear pillar (none of these being shown).

The inflator 105 substantially in a hollow cylindrical shape is fitted, for example, to the roof side rail, substantially in parallel to the airbag main body 103 in the folded state. The inflator 105 has a function to quickly spread the airbag main body 103 by supplying high-pressure gas into the airbag main body 103 through a gas supply pipe 105a, upon input of a shock.

The airbag main body 103 in a spread state has, as shown in FIG. 1, an inlet portion 103a for high-pressure gas, a branch portion 103b communicating with the inlet portion 103a, an expanding portion 103c formed by plural cells communicating with the branch portion 103b, and a non-expanding portion 13d to which high-pressure gas is not supplied.

The expanding portion 103c is formed by expanding portions 103c1, 103c3, 103c5, and 103c7 of a first group directly communicating with the branch portion 103b and expanding portions 103c2, 103c4, and 103c6 of a second group indirectly communicating with the branch portion 103b.

The expanding portion 103c1 of the first group and the expanding portion 103c2 of the second group, the expanding portions 103c1 and 103c2 neighboring each other, are isolated from each other by a partitioning portion 107a1 therebetween, and on the other hand, communicate with each other through a gas communicating portion 109a1.

The expanding portion 103c3 of the first group and the expanding portion 103c4 of the second group, the expanding portions 103c3 and 103c4 neighboring each other with the expanding portion 103c7 of the first group therebetween, are isolated from each other by a partitioning portion 107a2 partitioning the expanding portion 103c7 of the first group, and on the other hand, communicate with each other through a gas communicating portion 109a2.

Similarly to the above, the expanding portion 103c5 of the first group and the expanding portion 103c6 of the second group, the expanding portions 103c5 and 103c6 neighboring each other, are isolated from each other by a partitioning portion 107a3 therebetween, and on the other hand, communicate with each other through a gas communicating portion 109a3.

When the airbag main body 103 is in a spread state, the expanding portions 103c1, 103c2, and 103c3 are located such as to meet the position of a temporal region of the head of a front seat passenger (driver) PF, as shown in FIG. 1. The expanding portions 103c5 and 103c6 are located such as to meet the position of a temporal region of the head of a rear seat passenger PR, as shown in FIG. 1.

A problem here with the airbag main body 103 in the comparative example is that the gas communicating portion 109a2 in a spread state is located in the vicinity (see 'seatbelt interference region 120' enclosed by a dotted curve in FIG. 1) of the anchor portion (fixed to the center pillar; not shown) of a three-point seatbelt (not shown) for a front seat passenger. Consequently, in the comparative example, when the airbag main body 103 having expanded and spread by a shock from outside, the gas communicating portion 109a2 hits against the seatbelt, and possibly causes a problem that gas flow from the expanding portion 103c3 of the first group to the expanding portion 103c4 of the second group is blocked.

(Overview of Curtain Airbag Device 11 According to the Invention)

Figure 2:
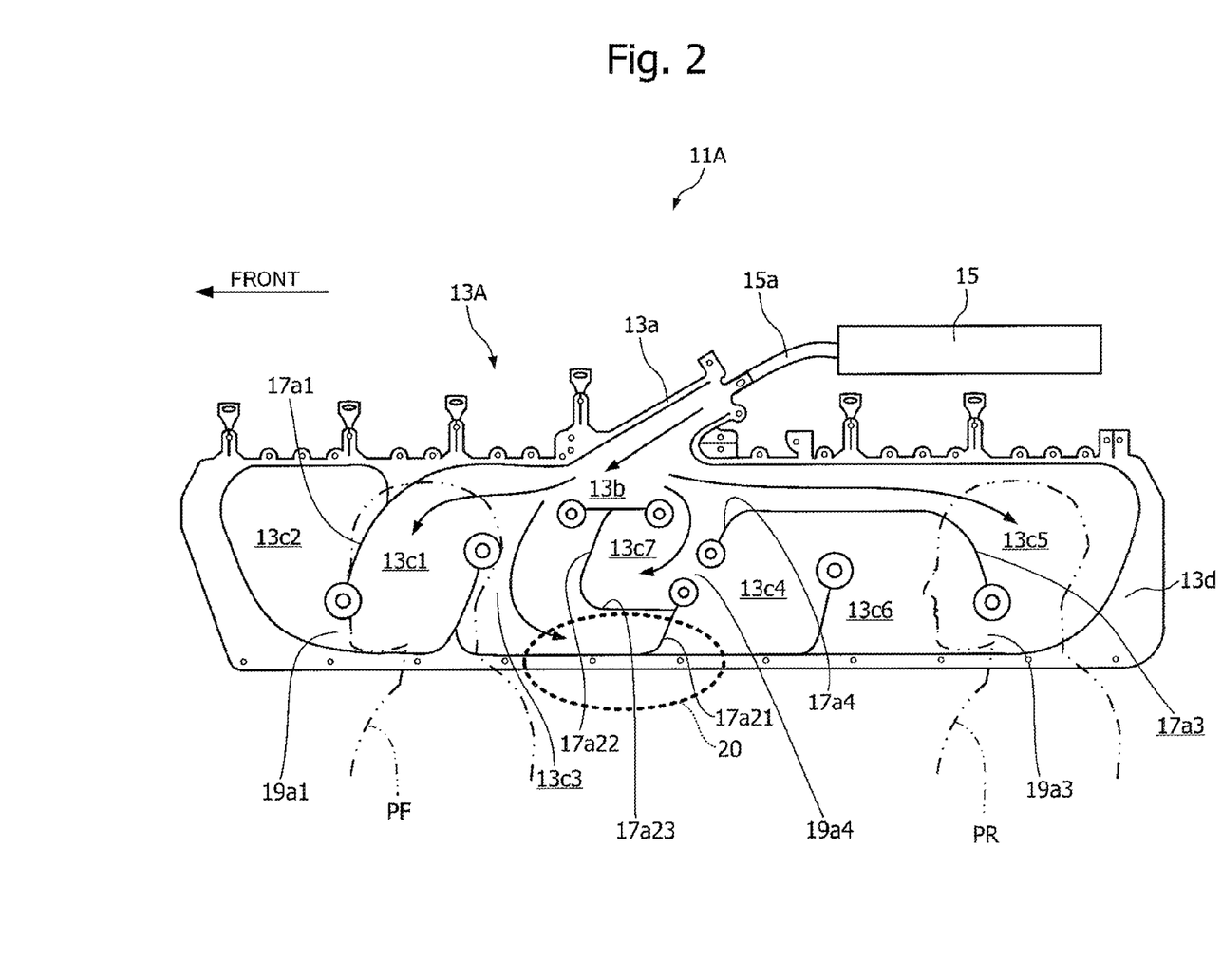
FIG. 2 is an illustration showing a state that the airbag main body of a curtain airbag device according to a first embodiment of the present invention is spread.

In this situation, the curtain airbag device 11 (comprehensively referring to curtain airbag devices 11A, 11B, and 11C according to the first to third embodiments of the invention) is arranged by adopting the following structure. For example, as shown in FIG. 2, an airbag main body 13 located at a position where the airbag main body 13 overlaps with the center pillar includes a first expanding portion 13c7 to which gas is supplied by operation of an inflator 15 when the airbag main body 13 spreads, a second expanding portion 13c4 to which gas is supplied from the first expanding portion 13c7, the second expanding portion 13c4 being disposed posterior to the first expanding portion 13c7, and a gas communicating portion 19a4 for communication between the first expanding portion 13c7 and the second expanding portion 13c4, wherein the gas communicating portion 19a4 is arranged above a seatbelt interference region 20 where the airbag main body 13 in a spread state interferes with the seatbelt.

The curtain airbag device 11 according to an embodiment of the present invention makes it possible to make gas flow smooth from the first expanding portion 13c7 to the second expanding portion 13c4 when the airbag main body 13 expands and spreads, upon reception of a shock from outside.

(Curtain Airbag Device 11A According to First Embodiment of the Invention)

A curtain airbag device 11A according to the first embodiment of the present invention will be described below, referring to FIG. 2. FIG. 2 is an illustration showing a state that the airbag main body 13A of a curtain airbag device 11A according to the first embodiment of the present invention is spread.

The curtain airbag device 11A according to the first embodiment of the present invention includes, as shown in FIG. 2, an airbag main body 13A disposed at a position where the airbag main body 13A overlaps with the center pillar, and an inflator 15 for supplying high-pressure gas into the airbag main body 13A, upon input of a shock, such as side collision.

The airbag main body 13A is, for example, a bag body of any one of woven fabric, knit fabric, and non-woven fabric of synthetic. The airbag main body 13A before spreading is housed, for example, on the rear surface side of a roof panel, not shown, in a folded state of an elongate bar shape extending from a front pillar through a roof side rail to a rear pillar.

The inflator 15 substantially in a hollow cylindrical shape is fitted, for example, to the roof side rail, substantially in parallel to the airbag main body 13A in the folded state. The inflator 15 has a function to quickly spread the airbag main body 13A by supplying high-pressure gas into the airbag main body 13A through a gas supply pipe 15a, upon input of a shock.

The spread airbag main body 13A in a spread state includes, as shown in FIG. 2, an inlet portion 13a for high-pressure gas, a branch portion 13b communicating with the inlet portion 13a, an expanding portion 13c formed by plural cells communicating with the branch portion 13b, and a non-expanding portion 13d to which high-pressure gas is not supplied. The expanding portion 13c and the non-expanding portion 13d are respectively formed, for example, by joining foundation cloths (foundation cloths of garment and lining) of a bag body forming the airbag main body 13A into a certain shape in a state of superimposed on each other. In this sewing, the portion where the sewing line is open to the branch portion 13b is the expanding portion 13c, while the portion where the sewing line is closed to the branch portion 13b is the non-expanding portion 13d.

The expanding portion 13c is formed by the expanding portions $13c1$, $13c3$, $13c5$, and $13c7$ of the first group directly communicating with the branch portion 13b, and the expanding portions $13c2$, $13c4$, and $13c6$ of the second group indirectly communicating with the branch portion 13b.

The expanding portion $13c1$ of the first group and the expanding portion $13c2$ of the second group, the expanding portions $13c1$ and $13c2$ neighboring with each other, are isolated from each other by a portioning portion $17a1$ therebetween, and communicate with each other through a gas communicating portion $19a1$ on the other hand.

Likewise, the expanding portion $13c5$ of the first group and the expanding portion $13c6$ of the second group, the expanding portions $13c5$ and $13c6$ neighboring with each other, are isolated from each other by a portioning portion $17a3$ therebetween, and communicate with each other through a gas communicating portion $19a3$ on the other hand.

The expanding portion $13c3$ of the first group and the expanding portion $13c4$ of the second group are isolated from each other by a partitioning portion $17a21$ therebetween. Further, the expanding portion $13c3$ of the first group and the expanding portion $13c7$ of the first group are isolated from each other by a partitioning portion $17a22$ therebetween.

The expanding portion $13c7$ of the first group and the expanding portion $13c4$ of the second group, the expanding portions $13c7$ and $13c4$ neighboring with each other, are isolated from each other by a partitioning portion $17a4$ therebetween, and communicate with each other through a gas communicating portion $19a4$ on the other hand. The expanding portion $13c4$ of the second group is disposed posterior to the expanding portion $13c7$ of the first group with respect to the driving direction of the vehicle.

When the airbag main body 13A is in a spread state, the expanding portions $13c1$, $13c2$, and $13c3$ are located such as to meet the position of a temporal region of the head of a front seat passenger (driver) PF, as shown in FIG. 2. The expanding portions $13c5$ and $13c6$ are located such as to meet the position of a temporal region of the head of a rear seat passenger PR, as shown in FIG. 2.

Herein, the difference between the curtain airbag device 101 according to the comparative example and the curtain airbag device 11A according to the first embodiment will be described. Primary difference between the comparative example and the first embodiment is in two points.

The first difference is that, in the comparative example, the expanding portion $103c3$ of the first group and the expanding portion $103c4$ of the second group communicate with each other through the gas communicating portion $109a2$ present in the seatbelt interference region 120. On the other hand, in the first embodiment, as shown in FIG. 2, the expanding portion $13c3$ of the first group and the expanding portion $13c4$ of the second group are isolated from each other by the partitioning portion $17a21$ (present in the interference region 20).

The second difference is that, in the comparative example, the expanding portion $103c7$ of the first group and the expanding portion $103c4$ of the second group are isolated from each other by the partitioning portion $107a4$ (see FIG. 1) therebetween. On the other hand, in the first embodiment, as shown in FIG. 2, the expanding portion corresponding to 'first expanding portion' according to the present invention) $13c7$ of the first group and the expanding portion (corresponding to 'second expanding portion' according to the present invention) $13c4$ of the second group are isolated from each other by the partitioning portion $17a4$ therebetween, while communicating with each other through the gas communicating portion (corresponding to 'gas communicating portion' according to the present invention) $19a4$ (present outside the seatbelt interference region 20).

(Operation and Advantage of Curtain Airbag Device 11A According to First Embodiment of the Invention)

The curtain airbag device 11A according to the first embodiment of the invention is arranged by adopting the following structure. As shown in FIG. 2, the airbag main body 13A, which is disposed at a position where the airbag main body 13A overlaps with the center pillar and is in a spread state, includes an expanding portion (the first expanding portion) $13c7$ to which gas is supplied by operation of the inflator 15 when the airbag main body 13A spreads, an expanding portion (the second expanding portion) $13c4$ to which gas is supplied from the expanding portion $13c7$ of the first group, the expanding portion (the second expanding portion) $13c4$ being disposed posterior to the expanding portion $13c7$ of the first group, and the gas communicating portion $19a4$ for communication between the expanding portion (the first expanding portion) of the first group and the expanding portion (the second expanding portion) $13c4$ of the second group, wherein the gas communicating portion $19a4$ is arranged above the seatbelt interference region 20 where the airbag main body 13A in the spread state interferes with the seatbelt.

The curtain airbag device 11A according to the first embodiment of the present invention is arranged such that the gas communicating portion $19a4$ is arranged above the seatbelt interference region 20 where the airbag main body 13A in a spread state interferes with the seatbelt so that gas flow in the gas communicating portion $19a4$ is not inhibited. Accordingly, when the airbag main body 13A has expanded and spread upon reception of a shock from outside, it is possible to make a gas flow smooth from the expanding portion (the first expanding portion) $13c7$ of the first group to the expanding portion (the second expanding portion) $13c4$ of the second group. As a result, the expanding portion (the second expanding portion) $13c4$ of the second group, the expanding portion $13c4$ being present adjacent to the seatbelt interference region 20, is ensured to expand.

Further, the curtain airbag device 11A according to the first embodiment of the present invention is arranged as follows. As shown in FIG. 2A, the expanding portion (the first expanding portion) $13c7$ of the first group is located adjacent to the seatbelt interference region 20 of the airbag main body 13A in a spread state, and a gas isolating portion $17a23$ extending substantially horizontally is provided on the seatbelt interference region 20 side of the expanding portion (the first expanding portion) $13c7$ of the first group of the airbag main body 13A in a spread state.

By the curtain airbag device 11A according to the first embodiment of the present invention, the expanding portion (the first expanding portion) $13c7$ of the first group, the expanding portion $13c7$ being present adjacent to the seatbelt interference region 20, can be appropriately isolated from interference by the seatbelt.

(Curtain Airbag Device 11B According to Second Embodiment of the Invention)

Figure 3:
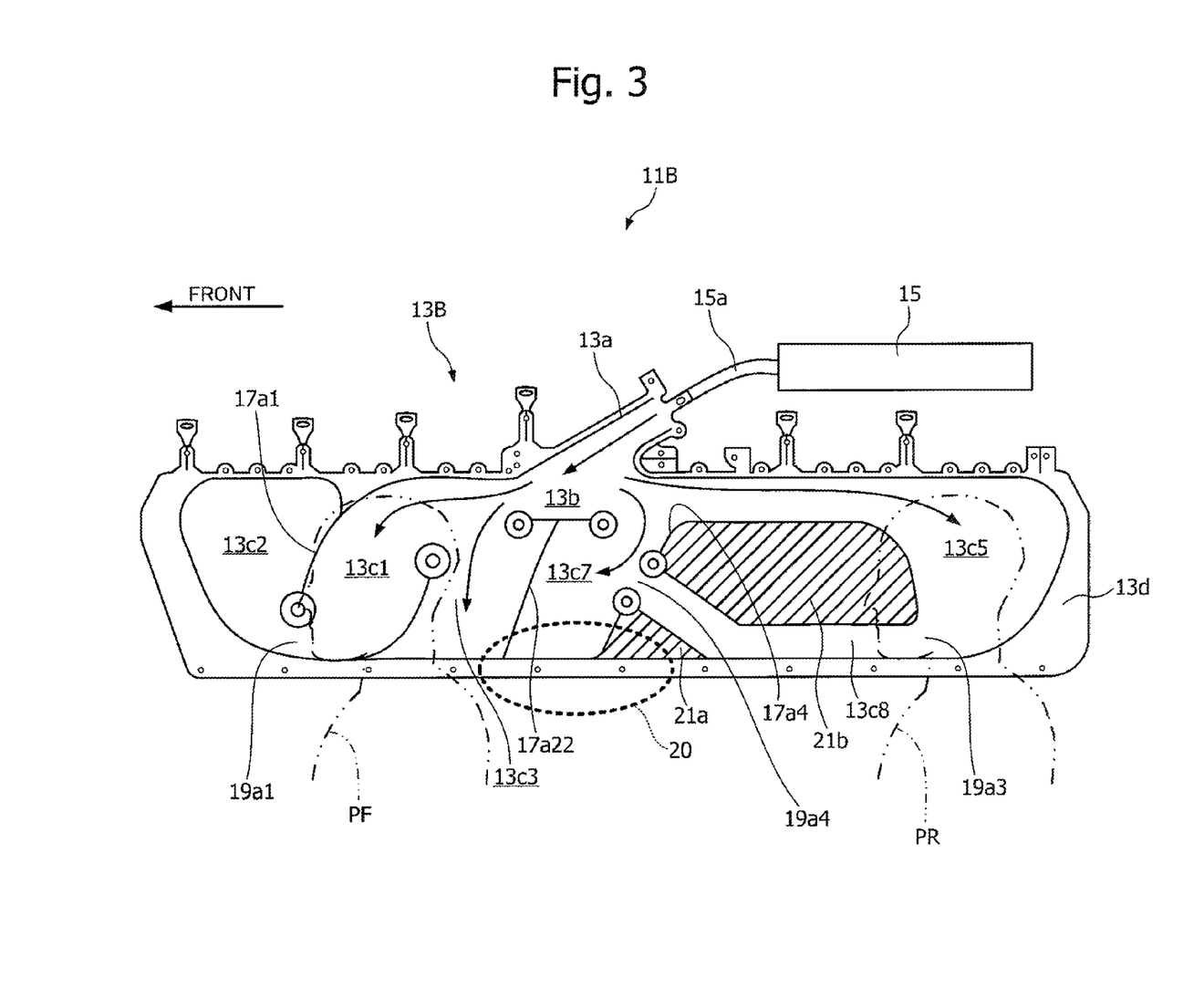
FIG. 3 is an illustration showing a state that the airbag main body of a curtain airbag device according to a second embodiment of the present invention is spread.

A curtain airbag device 11B according to the second embodiment of the present invention will be described below, referring to FIG. 3. FIG. 3 is an illustration showing a state that the airbag main body 13B of a curtain airbag device 11B according to the second embodiment of the present invention is spread.

The curtain airbag device 11A according to the first embodiment of the present invention and the curtain airbag device 11B according to the second embodiment of the present invention are similar in the basic structure. Accordingly, in the description related to the second embodiment of the present invention, a common symbol is assigned to a member having a function common with the first embodiment to thereby omit overlapping description, and different points between the two will be mainly described below. Primary difference between the first embodiment and the second embodiment is in two points.

The first difference is that the expanding portions 13c4 and 13c6 of the second group in the first embodiment are substituted in the second embodiment by non-expanding portions 21a, 21b and an expanding portion (corresponding to 'the second expanding portion' according to the present invention) 13c8 of the second group. The non-expanding portion 21a as a part of the above-described non expanding portion (portions) is arranged such as to overlap with the seatbelt interference region 20 of the airbag main body 13B in a spread state. The expanding portion 13c8 of the second group is disposed posterior to the expanding portion 13c7 of the first group with respect to the driving direction of the vehicle.

The second difference is that the gas communicating portion 19a4 according to the second embodiment communicates with the expanding portion 13c8 of the second group such as to isolate the non-expanding portions 21a and 21b from each other.

(Operation and Advantage of Curtain Airbag Device 11B According to Second Embodiment of the Invention)

The curtain airbag device 11B according to the second embodiment of the present invention is arranged by adopting a structure as follows. As shown in FIG. 3, an airbag main body 13B in a spread state further includes non-expanding portions 21a and 21b to which gas is not supplied by the operation of the inflator 15, and at least a part (21a) of the non-expanding portion (portions) 21a and 21b is arranged such as to overlap with the seatbelt interference region 20 of the airbag main body 13B in a spread state.

By the curtain airbag device 11B according to the second embodiment of the present invention, as the non-expanding portion 21a is provided such as to overlap with the seatbelt interference region 20 of the airbag main body 13B in a spread state, it is possible to sufficiently exert a passenger protecting function of the curtain airbag device 11B even in case that the seatbelt interfere with the airbag main body 13.

(Curtain Airbag Device 11B According to Third Embodiment of the Invention)

Figure 4:
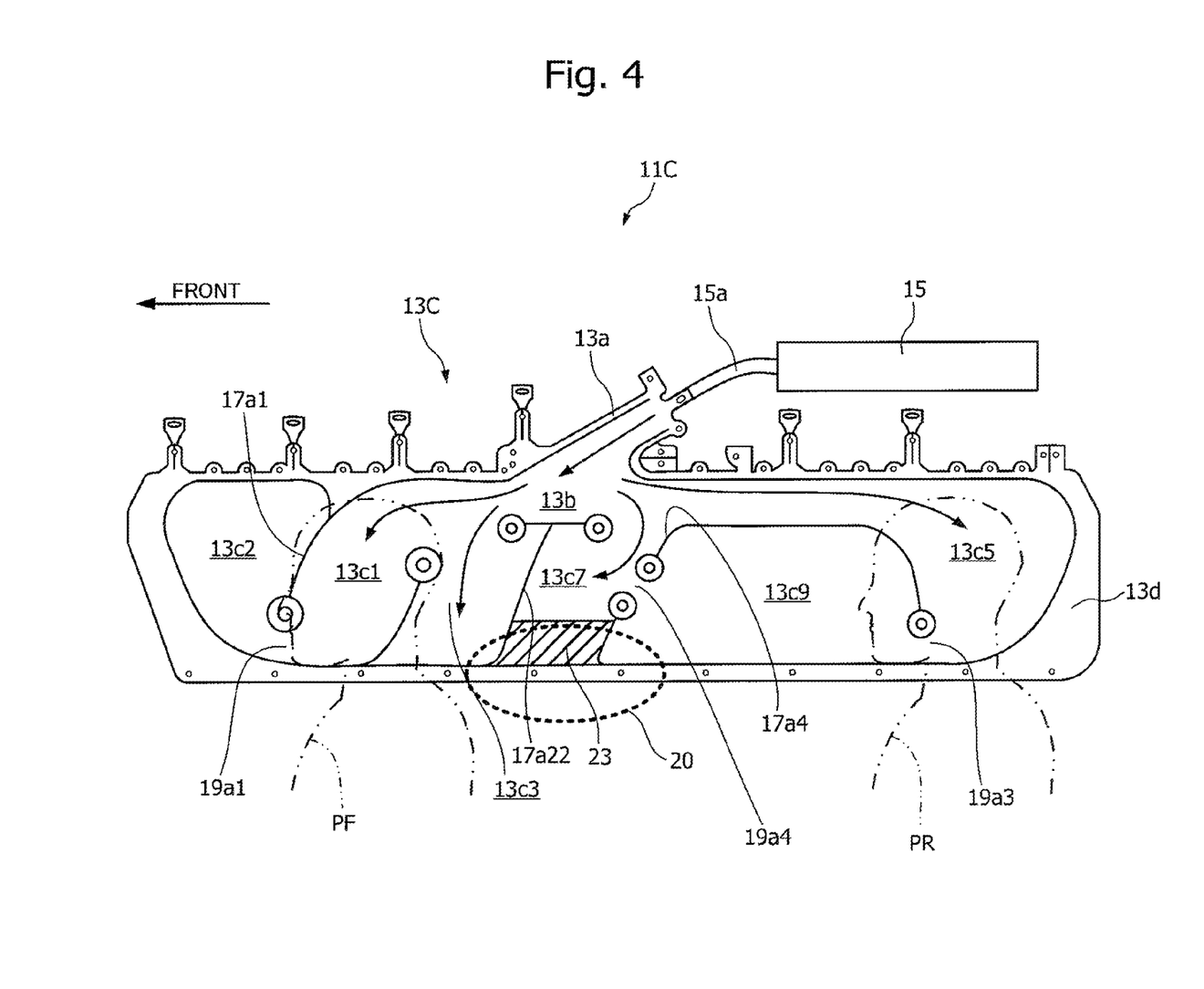
FIG. 4 is an illustration showing a state that the airbag main body of a curtain airbag device according to a third embodiment of the present invention is spread.

A curtain airbag device 11C according to the third embodiment of the present invention will be described below, referring to FIG. 4. FIG. 4 is an illustration showing a state that the airbag main body 13C of a curtain airbag device 11C according to the third embodiment of the present invention is spread.

The curtain airbag device 11B according to the second embodiment of the present invention and the curtain airbag device 11C according to the third embodiment of the present invention are similar in the basic structure. Accordingly, in the description related to the third embodiment of the present invention, a common symbol is assigned to a member having a function common with the second embodiment to thereby omit overlapping description, and different points between the two will be mainly described below. Primary difference between the second embodiment and the third embodiment is in two points.

The first difference is that the non-expanding portions 21a and 21b and the expanding portion 13c8 of the second group in the second embodiment are substituted in the third embodiment by an expanding portions 13c9 (corresponding to 'the second expanding portion' according to the present invention) of the second group. The expanding portion 13c9 of the second group is disposed posterior to the expanding portion 13c7 of the first group with respect to the driving direction of the vehicle.

The second difference is that the seatbelt interference region 20 of the expanding portion 13c7, of the first group according to the second embodiment, of the airbag main body 13C in a spreading state is substituted in the third embodiment by a non-expanding portion 23. In short, the seatbelt interference region 20 is set as the non-expanding portion 23.

(Operation and Advantage of Curtain Airbag Device 11C According to Third Embodiment of the Invention)

By the curtain airbag device 11C according to the third embodiment of the present invention, as shown in FIG. 4, as the seatbelt interference region 20 of the airbag main body 13C in a spread state is set as the non-expanding portion 23, it is possible to sufficiently exert a passenger protecting function of the curtain airbag device 11C even in case that the seatbelt interferes with the airbag main body 13C.

Other Embodiments

The foregoing embodiments are examples of embodying the present invention. Accordingly, the technical scope of the present invention must not be limited by these embodiments in interpretation. This is because the invention can be carried out in various embodiments without departing from the spirit or the major feature of the invention.

For example, in the first to third embodiments of the present invention, embodiments have been described, as examples, wherein the airbag main bodies 13A, 13B, and 13C are housed in a folded state of an elongate bar shape extending from a front pillar through a roof side rail to a rear pillar, however, the invention is not limited thereto. Embodiments in which the airbag main bodies 13A, 13B, and 13C are housed in a folded state of an elongate bar shape in the roof side rail (excluding the front pillar and the rear pillar) are also included in the technical scope of the invention.

DESCRIPTION OF SYMBOLS 11A, 11B, 11C: curtain airbag devices according to the first to third embodiments
13A, 13B. 13C: airbag main body
13c: expanding portion
13c7: expanding portion of the first group (first expanding portion)
13c4, 13c8, 13c9: expanding portion of the second group (second expanding portion)
13d: non-expanding portion
15: inflator
17a23: gas isolating portion
19a4: gas communicating portion
20: seatbelt interference region
21a, 21b: non-expanding portion
23: non-expanding portion

The invention claimed is:

1. A curtain airbag device capable of spreading an airbag main body provided along a roof side rail of a vehicle into a curtain shape and into a vehicle compartment by operation of an inflator,
wherein the airbag main body is disposed at a position where the airbag main body overlaps with a center pillar, and includes, in a spread state, a first expanding portion to which gas is supplied by operation of the inflator, a second expanding portion to which gas is supplied from the first expanding portion, the second expanding portion being disposed posterior to the first expanding portion, and a gas communicating for communication between the first expanding portion and the second expanding portion,
wherein the first expanding portion is isolated from the second expanding portion by first and second partitioning portions, the first and second partitioning portions together define the gas communication portion,
wherein the air bag device is adapted to supply the gas to the first expanding portion from the inflator via an inlet portion and a branch portion, and the gas flows from the inflator to the inlet portion, the branch portion, the first expanding portion, the gas communication portion and the second expanding portion in this order,
and wherein the gas communicating portion is arranged above a seatbelt interference region where the airbag main body in the spread state interferes with a seatbelt,
wherein the airbag main body in the spread state further includes a non-expanding portion to which as is not supplied by operation of the inflator, the non-expanding portion is isolated from the first expanding portion by the first partitioning portion and a part of the non-expanding portion is arranged such as to overlap with the seatbelt interference region in the spread state,
wherein the part of the non-expanding portion which overlaps with the seat belt interference region is arranged below the first expanding portion, and
wherein the as communication portion is arranged above and rear of the part of the non-expanding portion which overlaps with the seat belt interference region.

2. The curtain airbag device according to claim 1,
wherein the first expanding portion is located adjacent to the seatbelt interference region of the airbag main body in the spread state,
and wherein the first partitioning portion extending substantially in a horizontal direction is provided on a side of the seatbelt interference region of the first expanding portion of the airbag main body in the spread state and isolates the first expanding portion from the seatbelt interference region.

3. The curtain airbag device according to claim 1,
wherein the seatbelt interference region is set as the non-expanding portion.

4. The curtain airbag device according to claim 2,
wherein the seatbelt interference region is set as the non-expanding portion.

* * * * *